United States Patent [19]
Johnson et al.

[11] 3,765,948
[45] Oct. 16, 1973

[54] REWETTABLE BATTERY SEPARATOR
[75] Inventors: Burnett H. Johnson; Terrence Huff, both of Baytown, Tex.
[73] Assignee: Esso Research and Engineering Company, Linden, N.J.
[22] Filed: June 3, 1971
[21] Appl. No.: 149,677

[52] U.S. Cl.............. 136/146, 136/148, 252/8.8, 252/357
[51] Int. Cl..................... H01m 3/02, D06m 3/00
[58] Field of Search.......................... 136/146, 148; 252/8.8, 351, 357; 8/21 D, 180, DIG. 9; 264/48

[56] References Cited
UNITED STATES PATENTS
3,472,700 10/1969 Kollman et al. .................. 136/148
3,351,495 11/1967 Larsen et al. ...................... 136/148
3,354,247 11/1967 Zehender et al. .................. 136/148

FOREIGN PATENTS OR APPLICATIONS
952,111 3/1964 Great Britain .................... 136/148

*Primary Examiner*—Donald L. Walton
*Attorney*—Thomas B. McCulloch, Melvin F. Fincke, Kurt S. Myers and Sylvester W. Brock

[57] ABSTRACT

A nonwoven mat of polyolefin fiber is contacted with a gaseous sulfur dioxide-chlorine mixture to sulfochlorinate the surface of the polyolefin fibers and then treated with an amine, either after compacting the mat or before compacting the mat to form a structure suitable as a battery separator.

10 Claims, 2 Drawing Figures

PATENTED OCT 16 1973  3,765,948

Burnett H. Johnson,
Terrence Huff,
INVENTORS.

BY KURT S. MYERS,
ATTORNEY.

REWETTABLE BATTERY SEPARATOR

BACKGROUND OF THE INVENTION

1. Field of the Invention

The present invention is directed to a process for producing a rewettable battery separator from nonwoven mats of polyolefin fibers. More specifically, the present invention relates to the sulfo-chlorination of a nonwoven mat of polyolefin fibers and the treatment thereof with an amine so that the compacted mat forms a structure suitable as a battery separator which is rewettable.

2. Prior Art

Battery separators made from polyolefins, specifically polypropylene, are illustrated in the following U.S. Pat. Nos.:

| | |
|---|---|
| 3,002,040 | 3,092,438 |
| 3,026,366 | 3,216,864 |
| 3,045,058 | 3,314,821 |
| 3,055,966 | 3,351,495 |
| 3,084,091 | 3,354,247 |

British Patent 952,111 is directed to producing a chemically active polyolefin surface to which adhesives, dyes, inks and coatings in general will adhere, and which have little tendency to pick up static charge. The procedure described comprises exposing the polyolefin surface to a mixture of gaseous sulfur dioxide and chlorine in the presence of ultraviolet light to thereby form sulfochloride groups and reacting these sulfochloride groups at the surface of the polymer with a reagent selected from the class consisting of ammonia, monamines, polyamines, monohydric alcohols, polyhydric alcohols, alkylene oxides and aqueous alkali metal hydroxides.

SUMMARY OF THE INVENTION

The present invention is directed to a process for producing a rewettable battery separator by contacting a nonwoven mat of polyolefin fibers having a porosity greater than 40 percent with a gaseous sulfur dioxide-chlorine mixture in the presence of fluorescent light under conditions to obtain at least one percent sulfur in the nonwoven mat and treating the mat with an amine for sufficient time and in sufficient concentration to obtain 90 percent wettability in 20 minutes in a sulfuric acid solution. More specifically, the present invention is directed to a process for producing a compacted rewettable battery separator from a non-woven mat of polyolefin fibers, preferably produced by a melt-blowing process which comprises extruding the polyolefin such as polypropylene through a die into a heated air stream which attenuates the fibers to produce fine fibers (1 to 10 microns in diameter) and collecting these fibers on a moving screen in the form of a mat, by first contacting the mat with a gaseous sulfur dioxide-chlorine mixture and then treating the mat with an amine, preferably a polyamine.

DESCRIPTION OF THE PREFERRED EMBODIMENT

Figure 1:
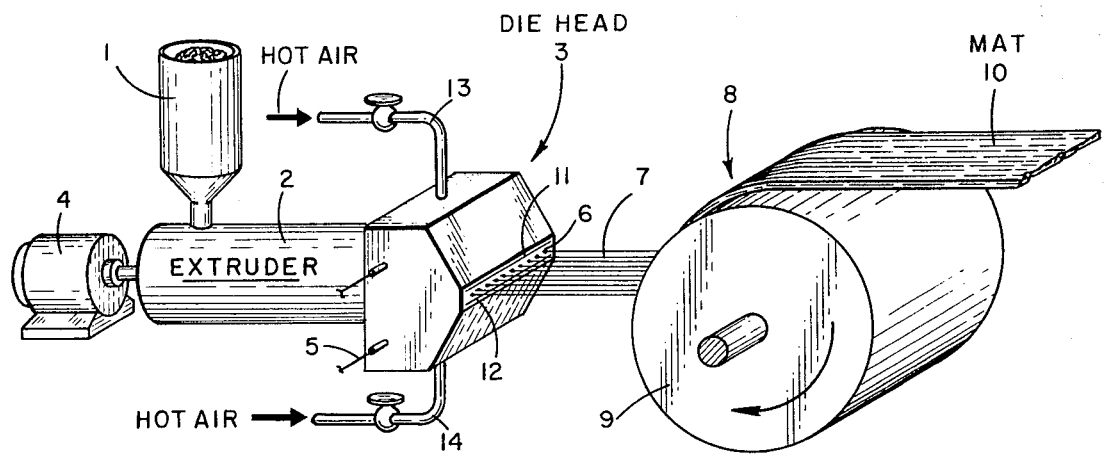
FIG. 1 is a schematic view of the overall melt-blowing process.

Referring to FIG. 1 of the drawings, a polyolefin specifically illustrated by polypropylene which is preferred, is introduced into a pellet hopper 1 of an extruder 2. The polypropylene used in the present invention has either been thermally treated before being introduced into the extruder 2 or is thermally treated in the extruder 2 and/or die head 3. According to the present invention, the polypropylene is added into the hopper 1 and then is heated in extruder 2 at temperatures in excess of 600° F. and preferably within the range of 620° to 800° F. After thermal treatment, the polypropylene is forced through the extruder 2 by a drive motor 4 into the die head 3. The die head 3 may contain a heating plate 5 which may also be used in the thermal treatment of the polypropylene before it is melt-blown. The polypropylene is then forced out a row of die openings 6 in the die head 3 into a gas stream which attenuates the polypropylene into fibers 7 which are collected on a moving collecting device 8 such as a drum 9 to form a continuous mat 10. The gas stream which attenuates the polypropylene is supplied through a gas jet 11 and 12, respectively. These gas slots 11 and 12 are supplied with a hot gas, preferably air, by gas lines 13 and 14, respectively.

Figure 2:
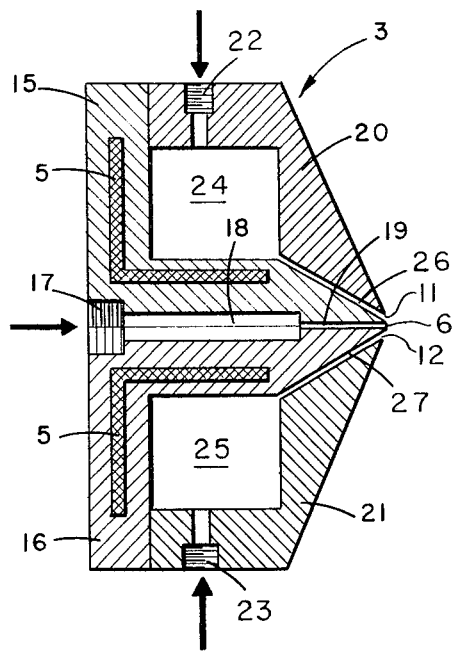
FIG. 2 is a cross-sectional view of a die.

The melt-blowing process may be further understood by considering the details of the die head 3 which is set forth in cross-section in FIG. 2. The polypropylene is introduced into the back of the die plates 15 and 16 through an inlet 17. The polypropylene then goes into a chamber 18 between the upper and lower die plates 15 and 16, respectively. The facing of the die plate 16 has milled grooves 19 which terminate in the die openings 6. It is understood, of course, that the mill grooves may be in the lower die plate 16, in the upper die plate 15, or grooves may be milled in both plates 15 and 16. An upper gas cover plate 20 and a lower gas cover plate 21 are connected to the upper die plate in lower die plate 15 and 16, respectively. The hot gas is supplied by inlets 22 in upper air plate 20 and lower inlet 23 in lower gas plate 21. Suitable baffling means (not shown) may be provided in both the upper air chamber 24 and lower air chamber 25 to provide a uniform flow of air through the gas slots 26 and 27, respectively. As shown in FIG. 2, the rear portion of the die head 3 may contain heating means 5 for heating both the polymer and air in the die head 3.

The gas flow is controlled so that the fibers as they are attenuated do not come into contact one with the other which results in "rope" and fiber bundles. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is between one to about 10 microns.

The fibers are collected as a self-supporting mat on a collecting device such as a rotating drum at distances of about 1 to 18 inches from the die openings. Preferably a mat of self-bonded fibers is collected at a distance between 3 to 8 inches. A "self-bonded" mat as used herein means that the mat is a coherent, integral structure capable of withstanding normal handling such as winding, unwinding, cutting, pressing, calendering, etc. without losing its essential mat-like character. In most mats used in the present invention, some thermal bonding occurs. The mat produced by the melt-blowing process is produced so as to have a basis weight of between 60 and 500 grams/square meter. The thickness of the nonwoven mat may vary between 20 and 200 mils.

To produce a battery separator from the nonwoven mat produced by the melt-blowing process, the mat must be compacted to obtain the desired thickness and porosity as well as the mechanical properties of strength and abrasion resistance. The nonwoven mat is compacted to a thickness of between 10 and 40 mils to be useful as a battery separator in most batteries. Compacting is preferably carried out by a thermal compacting operation utilizing calender rolls or a press to obtain a nonwoven mat of fixed thickness.

It has been found, according to the present invention, that the nonwoven mat of polyolefin fibers may be made wettable, as well as rewettable, by a sulfuric acid solution (may vary in concentration between 35 and 40 weight percent) by contacting the mat first with a sulfur dioxide-chlorine gaseous mixture and thereafter treating with an amine. The contacting step with the gaseous sulfur dioxide-chlorine mixture is carried out for about three minutes with a fluorescent light source at temperatures from 0° C. to about 130° C. employing ratios of sulfur dioxide to chlorine generally from 10:1 to 1:2, preferably 5:1 to 1:1. This reaction of the sulfur dioxide and chlorine is catalyzed by a source of ultraviolet radiation such as a fluorescent light, although the reaction may be carried out more rapidly with a stronger light source such as a mercury lamp. The light source is placed within about 6 inches from the non-woven mat, and preferably within about 3 inches therefrom. It has been found according to the present invention that the treatment with the sulfur dioxide-chlorine mixture requires that at least one percent sulfur be obtained in the nonwoven mat so as to obtain the desired wettability by the sulfuric acid solution. Accordingly, the specific conditions under which the nonwoven mat is contacted may vary provided that at least 1 percent sulfur in the mat is obtained.

After the nonwoven mat has been sulfo-chlorinated by the contacting step, the nonwoven mat is then treated with an amine, preferably a polyamine. A polyamine is preferred since after complete reaction with the sulfonyl-chloride functionality it may be used in lower molar concentration to obtain the desired high concentration of nitrogen in the nonwoven mat. To illustrate the effect of molar concentration in the reaction of an amine with the sulfonyl-chloride, an amine such as tetraethylene pentamine provides five nitrogen atoms per molecule of sulfur whereas ammonium hydroxide provides only one nitrogen atom per molecule of sulfur. Amines such as ethylene diamine, diethylene triamine, triethylene tetraamine, as well as ammonium hydroxide or a monoamine, may be used in the present invention. However, if ammonium hydroxide or a monoamine is used the amount of sulfur in the sulfochlorinated treated mat must be increased over 1 percent.

The reaction of the amine with the sulfo-chlorinated treated mat occurs quite rapidly. The treating of the mat with the amine may be carried out by spraying the mat with an amine in an aqueous solution. If sprayed, the concentration of the solution may be between 5 and 100 volume percent, and preferably between 40 and 60 volume percent. The treatment may also be carried out by dipping the sulfo-chlorinated nonwoven mat in the amine or an aqueous amine solution.

The compacting operation of the nonwoven mat to produce the desired battery separator may be carried out either before the contacting thereof with the sulfur dioxide-chlorine mixture and the treatment with the amine or after it has been contacted and treated so as to obtain a fixed desired thickness. The compacting operation is preferably a continuous operation such as by use of calender rolls but also may be carried out in a batch-type pressing operation. To obtain the fixed thickness, a shim or spacer may be used between the pressing plates or calender rolls, or the required pressure to obtain the fixed thickness may be determined. In producing a batter separator, an embossed pattern or rib may be pressed into the nonwoven structure to obtain battery separators with a desired design configuration. The embossing or the forming of ribs may be carried out at the same time the nonwoven mat is pressed to the fixed thickness in the compacting operation.

The nonwoven structures of the present invention are useful in the lead-acid batteries of the SLI-type (starting, lighting and ignition) and the industrial type batteries. These batteries have positive electrodes and negative electrodes which are separated by the battery separators. It has been found that a nonwoven polypropylene structure having a basis weight between 150 to 300 grams/square meter is preferred for producing battery separators of this type. The nonwoven structure is compacted to a thickness which may be between 15 to 35 mils and a porosity preferably of 50 percent or greater. The maximum pore size in a nonwoven structure of the present invention is generally below 25 microns in the better quality sheets. The maximum pore size of a battery separator is very important. Low maximum pore size means an effective barrier to active material growing through and bridging between opposite plates of the battery and thereby causing shorting. In order to achieve low electrical resistance, a high percent porosity in the nonwoven structures is required. For any nonwoven structure of given fiber size, increasing percent porosity also increases maximum pore size because the distance between adjacent fibers increases. An effective way to decrease pore size at a high percent porosity is to decrease the fiber size in the nonwoven structure. By forming the same weight of polyolefin into very small fibers and randomly distributing these fibers, the fiber-to-fiber distance is reduced and thus smaller pores are obtained. The very small fiber sizes utilized in the preferred embodiment thus make possible the combination of low electrical resistance and small pore size in the nonwoven structure.

The present invention will be further illustrated by the following specific examples which are given by way of illustration and not as limitations on the scope of the invention.

EXAMPLES 1–14

Polypropylene nonwoven mats produced by melt-blowing polypropylene into a mat and then compacted were treated with a gaseous sulfur dioxide-chlorine stream (5.2 mmoles each/min., premixed) under the influence of a 22 watt circular fluorescent light mounted exterior to the pyrex reaction vessel. The resultant chlorosulfonated polypropylene nonwoven mats were treated with two levels of aqueous tetraethylene pentamine (50 and 5 volume percent) and concentrated aqueous ammonium hydroxide to convert surface sulfonyl chloride groups to sulfonamide — polyamine and sulfonamide groups respectively.

The polypropylene nonwoven mats before treatment were composed of polypropylene fibers having diameters between 1 and 10 microns and a maximum pore size less than 25 microns. The nonwoven mats were not wettable using as the test floating a dry, 2 × 2 inches square of battery separator sample on a 40 weight percent aqueous sulfuric acid solution and measuring the time for specific percentages of the top of the sample to wet by wicking action. After treatment according to the present invention, the battery separators are wettable by a sulfuric acid solution which may vary in concentration between 35 and 40 percent by weight to better than 90 percent in 20 minutes. Wettability obtained on various samples as well as appropriate base cases are set forth in the following Table I.

ing a porosity greater than 40 percent with a gaseous sulfur dioxide-chlorine mixture in the presence of ultraviolet light under conditions to obtain at least 1 percent sulfur in the structure, and treating said mat with an amine for sufficient time and in sufficient concentration to obtain 90 percent wettability in 20 minutes in a sulfuric acid solution.

2. A process according to claim 1 wherein said nonwoven mat is compacted to form a rigid structure having a maximum pore size of less than 40 microns before contacting said nonwoven mat with said sulfur dioxide-chlorine mixture.

3. A process according to claim 1 wherein said nonwoven mat is compacted to form a rigid structure hav-

TABLE I

| Sample number | Min. $SO_2$-$Cl_2$ treat. | After treatment | Percent S | Percent Cl | Percent N | Time (min.) | Percent wet (40% $H_2SO_4$) |
|---|---|---|---|---|---|---|---|
| (1) | 0.5 | Spray with 50 vol. percent TEPA*, dry in 60° C. vac. oven overnight, water wash ~3 hrs., dry. | 00.9 | 0.37 | 0.46 | 60 | None |
| (2) | 1.0 | do | 0.21 | 0.70 | 0.93 | 60 | 3 |
| (3) | 2.0 | do | 0.78 | 1.42 | 1.32 | 20 | 55 |
| (4) | 4.0 | do | 1.23 | 2.37 | 2.42 | 0.4 | 95 |
| (5) | 5.0 | do | 1.27 | 2.40 | 2.57 | 0.03 | 100 |
| (6) | None | do | 0.01 | 0.02 | 0.13 | 60 | None |
| (7) | None | Spray with 5 vol. percent TEPA*, dry in 60° C. vac. oven overnight, water wash ~3 hrs., dry. | 0.03 | 0.10 | 0.08 | 20 | None |
| (8) | 2 | do | 1.1 | 4.5 | 0.27 | 20 | 90 |
| (9) | 4 | do | 1.4 | 6.2 | 0.06 | 20 | 1.0 |
| (10) | 5 | do | 1.5 | 5.6 | 0.04 | 20 | 1.5 |
| (11) | 15 | do | 2.0 | 8.4 | 0.14 | 20 | 99.5 |
| (12) | 10 | do | 1.8 | 6.5 | 0.03 | 20 | 98 |
| (13) | 15 | Dip in conc. $NH_4OH$ for >48 hrs., water wash ~3 hrs., dry | 1.9 | 6.2 | 0.78 | 20 | 80 |
| (14) | None | do | | | | 60 | None |

*Tetraethylene pentamine.

As set forth in the above Table I, the spray treatments were the aqueous solution. The mats were dried overnight as a matter of convenience, then washed in a flowing stream of water and dried at 60° C. in a vacuum (1 mm Hg) for 24 hours or greater before testing by the test set forth hereinabove for wettability. The time and percentage of area wetted are set forth in the last two columns of Table I.

It is illustrated by comparing samples 1-6 with samples 7-12 the effect of concentration of a specific amine when sprayed on the completness of reaction with the sulfonyl chloride groups of the surface of the fibers in the nonwoven mat.

The nature and object of the present invention having been completely described and illustrated and the best mode thereof contemplated set forth, what we wish to claim as new and useful and secure by Letters Patent is:

1. A process for preparing a rewettable polyolefin nonwoven battery separator which comprises:

contacting a nonwoven mat of polyolefin fibers having a maximum pore size of less than 40 microns after treating said mat with an amine.

4. A process according to claim 1 wherein said nonwoven structure is made of polypropylene fibers.

5. A process according to claim 1 wherein said nonwoven mat is contacted for at least 3 minutes with about a 50-50 mixture of sulfur dioxide and chlorine.

6. A process according to claim 5 wherein said nonwoven structure is made of polypropylene fibers having diameters between 1 and 10 microns.

7. A process according to claim 1 wherein said ultraviolet light emanates from a fluorescent light source.

8. A process according to claim 2 wherein said amine is tet-raethylenepentaamine.

9. A rewettable battery separator prepared according to the process of claim 1.

10. A wettable battery separator prepared according to the process of claim 1 wherein said polyolefin is polypropylene and said amine is tetraethylenepentaamine.

* * * * *